United States Patent [19]

Leiby, Jr.

[11] 4,147,995

[45] Apr. 3, 1979

[54] FOIL MODERATED RADIOACTIVE PREIONIZATION SYSTEM FOR GAS LASERS

[75] Inventor: Clare C. Leiby, Jr., Bedford, Mass.

[73] Assignee: The United States of America as represented by the Secretary of the Air Force, Washington, D.C.

[21] Appl. No.: 826,221

[22] Filed: Aug. 19, 1977

[51] Int. Cl.² ............................................. H01S 3/09
[52] U.S. Cl. ........................................... 331/94.5 PE
[58] Field of Search ................... 331/94.5 G, 94.5 D, 331/94.5 P, 94.5 PE; 330/4.3

[56] References Cited

U.S. PATENT DOCUMENTS

| | | | |
|---|---|---|---|
| 3,935,547 | 1/1976 | Riemersma et al. | 331/94.5 PE |
| 3,986,139 | 10/1976 | Meneely et al. | 331/94.5 G |
| 4,064,465 | 12/1977 | Hundstad et al. | 331/94.5 PE |

*Primary Examiner*—William L. Sikes
*Attorney, Agent, or Firm*—Joseph E. Rusz; Jacob N. Erlich

[57] ABSTRACT

A safe, radioactive preionization system having a thin metallic film or foil, either placed in front of or deposited on the surface of radioactive sources, in order to isolate the radioactive source from laser discharge regions and to produce copious secondary emission electrons. The film or foil prevents bombardment of the radioactive source by discharge electrons and/or ions. In addition, the secondary emission electrons ejected from the metallic film or foil are more numerous than the radioactive decay particles which produce them and have lower energies. Hence, they are much more efficient preionization agents than the high energy particles emitted by the radioactive source.

10 Claims, 6 Drawing Figures

FOIL MODERATED RADIOACTIVE PREIONIZATION SYSTEM FOR GAS LASERS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to preionization sources for gas lasers, and, in particular, to a safe radioactive preionization system for gas lasers which produce numerous secondary emission electrons.

Lasers find use in a wide diversity of activities ranging from communication over great distances to the drilling of very accurate holes in objects.

Most lasers consist of a column of active material having a partly reflecting mirror at one end and a fully reflecting mirror at the other. The laser is primed by pumping the atoms of the active material, by means of a flash of intense light, to an excited state. With a preponderance of atoms in that state the system can be stimulated to produce a cascade of photons, all the same wavelength and all in step, by triggering the emission of energy that drops the atoms from the excited state to a lower energy state. A photon carrying this quantum of energy, on striking an excited atom, causes it to emit a photon at the same frequency, and the light wave thus released falls in step with the triggering one. Waves that travel to the sides of the column leave the system, but those that go to the ends of the column along its axis are reflected back and forth by the mirrors. The column, whose length is a whole number of wavelengths at the selected frequency, acts as a cavity resonator, and a beam of monochromatic, coherent light rapidly builds in intensity as one atom after another is stimulated to emit photons with the same energy and direction. After the laser light has built up in this way it emerges through the partly reflecting mirror at one end of the column as an intense highly directional beam.

The active medium of a gas laser, such as, for example, the conventional $CO_2$ laser is an electrically excited mixture of carbon dioxide, nitrogen and helium. Uniform excitation of the gas mixture at atmospheric pressure, however, is not readily achieved. As the pressure is increased in the conventional low-pressure glow discharge, the characteristics of the discharge change, and at about 200 torr the flow constricts to an arc.

In some instances, a glow discharge can be maintained in the gas by making the discharge time short compared to the arc formation time or by limiting the discharge current density below that required for the formation of a constricted arc. It has been found that for a 1-m discharge length at atmospheric pressure, voltages in the neighborhood of $10^6$ volts are required for proper excitation of $CO_2$ lasers. To meet the requirement of a short discharge time and to lessen the requirement for such extremely high applied voltages, scientists used pulsed transverse excitation, that is, a discharge that is transverse rather than parallel to the optic axis.

Various methods of preionization are used in gas lasers to obtain larger volumes of gas discharge and thus more energy. Preionization refers to the presence of charged particles in the gas volume prior to initiation of the discharge. These charges aid in the initiation of a large volume glow discharge of high spatial uniformity.

In order to avoid arcing and to achieve uniform electrical discharges in gaseous lasers, it is necessary to create a background ionization level well above ambient prior to the initiation of the laser discharge. One method used for achieving this spatially uniform "preionization" is to irradiate the laser gases with ionizing ultra-violet photons. These are commonly generated by weak spark discharges in the vicinity of the lasing volume.

Another method of preionization is one in which the energetic particles emitted by radioactive materials are used to impact ionize the laser gases. Although at first glance this method appears to have substantial merit, there are health safety problems and other drawbacks associated with it. For example, there is the spatial uniformity and ionization efficiency problems associated with the various types of radioactive decay products. Alpha-particles (helium nuclei) do not generate uniform background preionization in gases, but only create very narrow, concentrated ionization paths through the gases. These paths are randomly distributed throughout the gas, and, owing to very rapid electron-ion volume recombination processes in the dense ionization trails, are extremely short lived. Thus, at the instant when the laser discharge is initiated, there are only a few, randomly distributed, highly ionized trails present in the laser gas and a uniform discharge is impossible. Similarly, gammaray photons have very large mean free paths in gases and generate very little volume ionization during their traversals of the lasing volume. As far as beta particles (electrons) are concerned, owing to the exponential drop-off of their ionizing power with increasing beta energy, only the low energy end of the beta particle distribution function contributes appreciably to the preionization process. The high energy betas completely traverse the laser volume without generating sensible amounts of ionization in the laser gases.

In addition, the proximity of radioactive materials to the laser discharge volume subjects such materials to probable bombardment by discharge ions and/or electrons. Such bombardment can dislodge sensible amounts of radioactive material, disperse it throughout the laser discharge volume, and contaminate the laser's component parts. Because of this process, health safety considerations would preclude the use of radioactive materials in gas discharge lasers unless precautions are taken to prevent its occurrance.

SUMMARY OF THE INVENTION

The instant invention sets forth a safe radioactive preionization system for use in gas lasers and which overcomes the problems set forth in detail hereinabove.

The radioactive preionization system of this invention is incorporated within the optical or resonant cavity of a conventional gas laser and is composed of a thin metallic film or foil situated between a radioactive source and the laser discharge volume. The bombardment of the side of the foil or film facing the radioactive source ("back side") will result in the emission of secondary electrons from the opposite side ("front side") of the film or foil. The energy of the bombarding particle is divided between the number of electrons which it generates less an energy loss in the foil or film itself. Alpha particles and high energy electrons from radioactive sources are used to produce larger numbers of ionizing particles than are produced by the radioactive sources themselves. Moreover, because the energies of these secondaries are smaller than the energies of the bombarding particles, their ionization efficiencies are larger than those of the bombarding particles. Moreover, for radioactive particles such as alpha particles, protons and neutrons these secondary electrons generate a much more spatially uniform preionization plasma in the laser volume than is possible without the foil.

The instant invention has the added significant advantage of preventing bombardment of the radioactive sources by the ions and/or electrons generated in the laser discharges. These plasma ions and electrons have very low energies, compared to the energies of the particles generated by radioactive sources. Hence, they generate negligible amounts of very low energy secondary electrons from the back side of the protecting foil or film. Thus, sputtering of the radioactive source material and consequent radioactive contamination of laser component parts is prevented.

It is therefore an object of this invention to provide a radioactive preionization system for gas lasers which substantially reduces the health and safety problems associated with the radioactive preionization systems of the past.

It is a further object of this invention to provide a radioactive preionization system for gas lasers which produces larger numbers of ionizing particles than are produced by the radioactive source itself.

It is another object of this invention to provide a means for utilizing heavy radioactive decay products such as alpha-particles, protons and neutrons to generate spatially uniform, high electron density preionization plasmas in gas lasers.

It is still another object of this invention to provide a radioactive preionization for gas lasers which is economical to produce and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DESCRIPTION OF THE PREFERRED EMBODIMENTS

Figure 1:
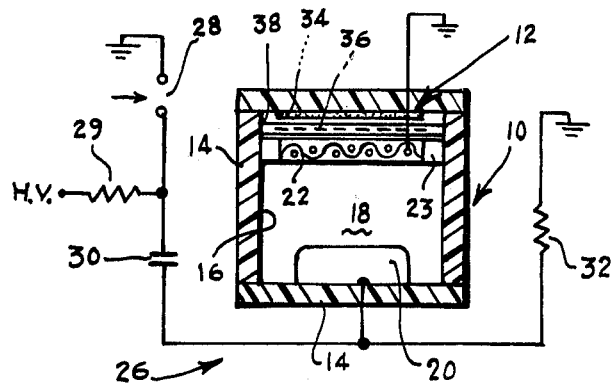
FIG. 1 is an end view, shown partly in cross section, of a gas laser incorporating therein the radioactive preionization system of this invention with the laser discharge circuit being shown in schematic fashion.
Figure 2:
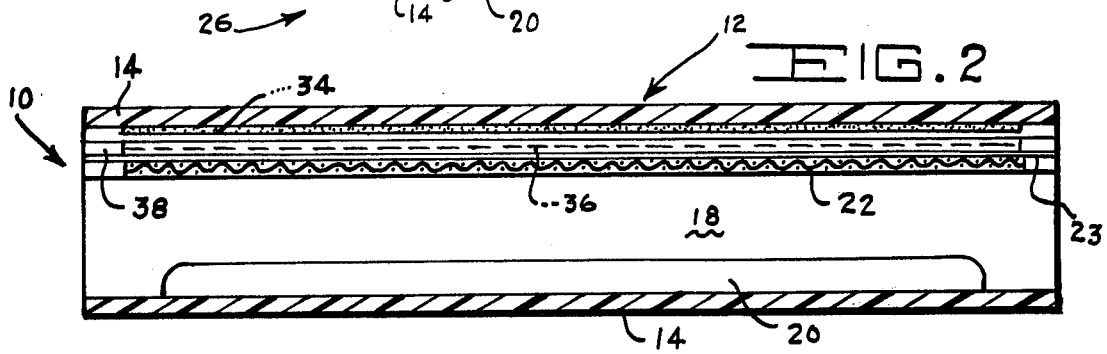
FIG. 2 is a side view, shown partly in cross section, of the gas laser of FIG. 1 incorporating therein the radioactive preionization system of this invention.

Reference is now made to FIGS. 1 and 2 of the drawing which best shows the gas laser 10 utilized with the radioactive preionization system 12 of this invention. Although this invention finds its main utility incorporated within a Transverse Excitation Atmospheric (TEA) laser 10, any other conventional gas laser can be utilized with this invention.

Laser 10 is shown as a conventional TEA gas laser, made up of an outer housing 14 of any suitable material such as plexiglass which forms the optical or resonant cavity 16 in which the active gases 18 are contained. A pair of electrodes 20 and 22 are mounted in any conventional manner within resonant cavity 16.

Figure 4:
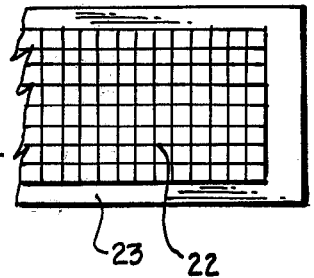
FIG. 4 is a plan view of a portion of the mesh electrode and holding frame of the gas laser of FIG. 1.

In the embodiment shown in FIGS. 1 and 2 electrode 20 is preferably a Rogowski profile electrode while electrode 22 is conventionally termed a perforated or wire mesh electrode (shown in FIG. 4) contained within a rectangular-shaped frame 23, preferably of metal. Marx bank, Blumlein or any other standard TEA laser discharge circuit 26 can be utilized with the instant invention. This circuit (shown only in FIG. 1) initiates the laser action by a trigger spark gap 28 in conjunction with a high voltage source and resistance 29 in the order of 1 meg $\Omega$, a capacitor 30 of 0.01 $\mu$fd and a resistor 32 of $\sim$ 10K $\Omega$ as shown in FIG. 1 of the drawing.

Figure 3:
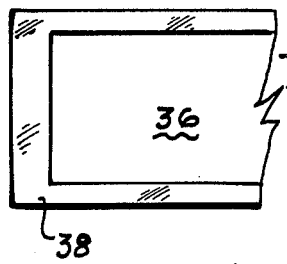
FIG. 3 is a plan view of a portion of the metallic foil and holding frame of the system of this invention.

Still referring to FIGS. 1 and 2 of the drawing, the radioactive preionization system 12 of this invention utilizes a radioactive particle source 34, in the form of conventional alpha, proton, neutron or electron sources mounted on the interior surface of housing 14 between housing 14 and wire mesh electrode 22. Examples of radioactive sources 34 which could be used with this invention are Ni 63, Tl 204 and Po 210. Situated as close as possible to source 34 between source 34 and electrode 22 is a thin metallic foil or film 36 made of any suitable low atomic weight metal such as aluminum, titanium or nickel. Moreover, the material and thickness of foil 36 may be tailored for a particular radioactive decay particle source 34 and laser discharge volume to obtain maximum ionization and spatial uniformity of the preionization plasma. In fact, it would be most desirable to plate or deposit the thin film 36 directly on source 34 if the radioactive source material 34 were prevented from diffusing through the plating. However, as shown in FIG. 3, in most instances, foil 36 is contained within a rectangular-shaped holding frame 38 made of any suitable insulating material. Frame 38 is fixedly secured by a conventional holding means (not shown) to the interior of housing 14 (shown in FIGS. 1 and 2). Essentially, the instant invention requires foil 36 to be interposed between the radioactive source 34 and the laser volume containing gases 18.

During operation, the bombardment of the side of foil 36 facing the radioactive source 34 will result in the emission of secondary electrons from the opposite side of foil 36. The energy of the bombarding particle is divided between the number of electrons which it generates less an energy loss in foil 36. Thus, alpha particles and high energy electrons from radioactive sources 34 are capable of producing larger numbers of ionizing particles than are produced by the radioactive sources themselves. Moreover, because the energies of these secondary emissions are smaller than the energies of the bombarding particles, their ionization efficiencies are larger than those of the bombarding particles.

By tailoring the thickness of foil 36 to the particular radioactive source 34 being used, the average energy of the secondary electrons can be controlled. Hence the ionizing range of the secondaries can be tailored to the dimensions of the laser volume. Although some of the energy of the particles emitted by the radioactive source is dissipated in heat in foil 36, the much larger number of much more efficient secondary ionizing electrons will result in a far greater degree of pre-ionization in laser gas 18, especially when radioactive sources 34 which emit alpha-particles, protons and/or neutrons are employed. Furthermore, the interposition of metallic foil 36 between the radioactive source 34 and the laser discharge volume isolates source 34 from the discharge. Thus foil 36, rather than source 34, is subjected to discharge ion and/or electron bombardment, and sputtering of the radioactive material will not occur. This eliminates a potentially serious health hazard.

Figure 5:
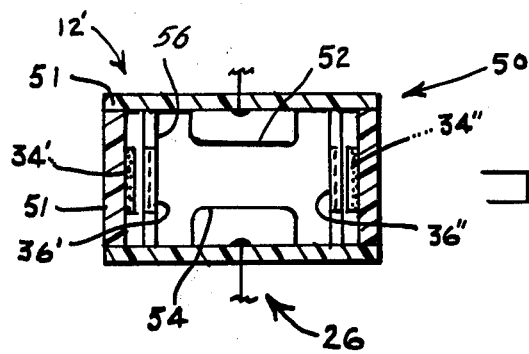
FIG. 5 is an end view, shown partly in cross section, of a gas laser incorporating therein another embodiment of the radioactive preionization system of this invention.
Figure 6:
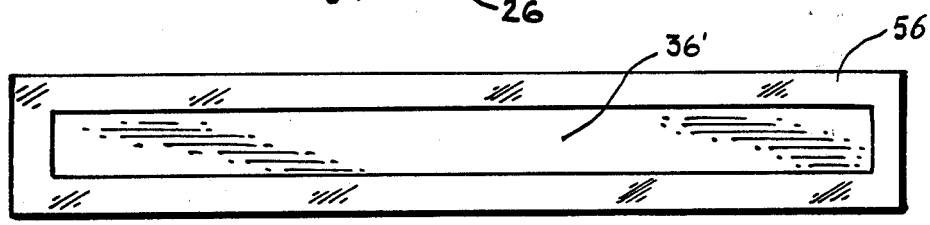
FIG. 6 is a plan view of the metallic foil and holding frame of the alternate embodiment of the system of this invention.

FIG. 5 represents an alternate embodiment 12' of the radioactive preionization system of this invention within a conventional TEA laser 50. Laser 50 is made up of a housing 51 having mounted on opposite walls thereof a pair of Rogowski profile electrodes 52 and 54, respectively. The embodiment 12' of this invention set forth in FIG. 5 utilizes a pair of radioactive sources 34' and 34" in opposed relationship instead of the single source 34 of FIGS. 1 and 2. Radioactive sources 34' and 34" are mounted on the walls of housing 51 located perpendicular to the walls which mount electrodes 52 and 54. Just as in the embodiment of FIGS. 1–4, a thin metallic foil 36' (and 36") is interposed between the sources 34' (and 34") and the lasing volume.

In the embodiment of FIG. 5, however, each foil 36' or 36" is contained within a holding frame 56 which is so constructed that when in place the shortest distance or separation, A, between the foil 36' and 36", respectively, and the electrodes 52 and 54 is greater than half the distance or separation, D, between electrodes 52 and 54 ($A > \frac{1}{2}D$). When such a criteria is met arcing is prevented between the electrodes 52 and 54 and foils 36' and 36". Frame 56 may be eliminated if the foil is plated directly on the source 34' or 34" and the limitation $A > \frac{1}{2}D$ is met. Since the basic concept and operation of the radioactive preionization system 12 and 12' are essentially identical, a detailed explanation of system 12' is not set forth.

Furthermore, it should be understood that although the instant invention has been described with reference to particular embodiments and lasers, it will be understood to those skilled in the art that this invention is also capable of adaptation to other lasers and a variety of alternate embodiments within the spirit and scope of the appended claims.

I claim:

1. In a gas laser having a resonant cavity and a pair of electrodes located within said cavity, the improvement therein comprises a radioactive source situated within said cavity and a thin metallic foil interposed between said radioactive source and at least one of said electrodes thereby forming a safe, radioactive preionization system for said gas laser.

2. In a gas laser having a resonant cavity and a pair of electrodes located within said cavity as defined in claim 1 wherein said thin metallic foil is mounted within a frame, said frame being secured within said resonant cavity adjacent said radioactive source.

3. In a gas laser having a resonant cavity and a pair of electrodes located within said cavity as defined in claim 2 wherein said thin metallic foil is located extremely close to said radioactive source.

4. In a gas laser having a resonant cavity and a pair of electrodes located within said cavity as defined in claim 1 wherein said thin metallic foil is deposited directly upon said radioactive source.

5. In a gas laser having a resonant cavity and a pair of electrodes located within said cavity as defined in claim 4 wherein said thin metallic foil is made of a material having a low atomic weight.

6. In a gas laser having a resonant cavity and a pair of electrodes located within said cavity as defined in claim 3 wherein said thin metallic foil is made of a material having a low atomic weight.

7. In a gas laser having a resonant cavity and a pair of electrodes located within said cavity as defined in claim 1 further comprising another radioactive source situated within said resonant cavity, another thin metallic foil interposed between said other source and said electrodes and wherein the shortest distance between each of said foils and said electrodes is greater than half the distance between said electrodes.

8. A method of providing a safe, radioactive preionization system for use in a gas laser having a resonant cavity and a pair of electrodes, said method comprising the steps of:
   (a) mounting a radioactive source within said resonant cavity of said gas laser, and
   (b) interposing a thin metallic foil between said radioactive source and at least one of said electrodes thereby isolating said radioactive source from the laser discharge region and producing copious secondary electron emissions.

9. A method of providing a safe, radioactive preionization system for use in a gas laser having a resonant cavity and a pair of electrodes as defined in claim 8 further comprising the step of depositing said thin metallic foil directly on said radioactive source.

10. A method of providing a safe, radioactive preionization system for use in a gas laser having a resonant cavity and a pair of electrodes as defined in claim 9 wherein said thin metallic foil is made of a material having a low atomic weight.

* * * * *